United States Patent
Lee et al.

(10) Patent No.: US 10,574,958 B2
(45) Date of Patent: Feb. 25, 2020

(54) DISPLAY APPARATUS AND RECORDING MEDIUM

(71) Applicant: SAMSUNG ELECTRONICS CO., LTD., Suwon-si, Gyeonggi-do (KR)

(72) Inventors: Hyun-seung Lee, Seoul (KR); Sung-hun Choi, Yongin-si (KR); Young-su Moon, Seoul (KR); Young-hoon Jeong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 62 days.

(21) Appl. No.: 15/674,839

(22) Filed: Aug. 11, 2017

(65) Prior Publication Data
US 2018/0091788 A1 Mar. 29, 2018

(30) Foreign Application Priority Data
Sep. 26, 2016 (KR) .................. 10-2016-0123352

(51) Int. Cl.
| | |
|---|---|
| *H04N 9/64* | (2006.01) |
| *G06T 7/11* | (2017.01) |
| *G06T 7/13* | (2017.01) |
| *G06T 7/90* | (2017.01) |
| *G06T 5/00* | (2006.01) |

(52) U.S. Cl.
CPC ............. *H04N 9/646* (2013.01); *G06T 5/001* (2013.01); *G06T 7/11* (2017.01); *G06T 7/13* (2017.01); *G06T 7/90* (2017.01)

(58) Field of Classification Search
CPC ..... G06T 7/13; G06T 7/11; G06T 7/90; G06T 5/001; H04N 9/646
See application file for complete search history.

(56) References Cited

U.S. PATENT DOCUMENTS

| | | | |
|---|---|---|---|
| 6,681,053 B1* | 1/2004 | Zhu .......................... | G09G 5/28 358/3.07 |
| 7,577,311 B2 | 8/2009 | Palum et al. | |
| 8,385,642 B2 | 2/2013 | Chuang et al. | |
| 2008/0170248 A1* | 7/2008 | Kang ..................... | H04N 9/045 358/1.9 |

* cited by examiner

*Primary Examiner* — Ruiping Li
(74) *Attorney, Agent, or Firm* — Nixon & Vanderhye P.C.

(57) ABSTRACT

A display apparatus includes a display, a signal processor configured to process an image signal to display an image on the display, and a controller configured to determine at least one region of possible color distortion from an edge area in the image displayed on the display and to change a color of the determined at least one region, based on a probability that a color distortion occurs in the determined at least one region and a replacement color.

18 Claims, 9 Drawing Sheets

DISPLAY APPARATUS AND RECORDING MEDIUM

CROSS-REFERENCE TO RELATED APPLICATION

This application is based on and claims priority under 35 U.S.C. § 119 to Korean Patent Application No. 10-2016-0123352, filed on Sep. 26, 2016 in the Korean Intellectual Property Office, the disclosure of which is incorporated by reference herein in its entirety.

BACKGROUND

Field

The present disclosure relates generally to a display apparatus for processing an image signal to display an image and a recording medium, and for example, to a display apparatus, which detects color distortion phenomenon capable of appearing in an image on a display according to a structure of the display and if there is the color distortion phenomenon, corrects it to improve image quality, and a recording medium in which a computer-readable program for performing such a function is recorded.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including image data from the exterior, and processes image data extracted from the content signal, in accordance with various image processing processes. The image processing apparatus displays an image based on the processed image data on its own display panel, or outputs the processed image data to another display apparatus provided with a panel so that the corresponding display apparatus can display an image based on the processed image signal. An image processing apparatus, which includes the display panel, calls especially a display apparatus, and as examples thereof, there are a television (TV), a monitor, a portable multimedia player (PMP), a tablet personal computer, a mobile phone, etc.

It is increasing that the display apparatus is used outdoors, such as at an advertising board or a stage, as well as indoors. Due to the nature of use environments, each of display apparatuses used at outdoor and indoor environments may usually have a different structure applied thereto. For example, since the display apparatus used at outdoors should provide a relatively large screen to allow a plurality of remote users to see the screen, a display thereof should have characteristics, such as a wide extendibility, a high brightness, a high color gamut, and so on. To satisfy such characteristics, the display apparatus may usually have a display with a structure including light emitting diodes (LEDs) for RGB colors in pixel unit, which is not a liquid display panel used indoors or portably. For convenience, such a display is referred to a LED display.

However, if the display apparatus with the large screen is to display image contents created to satisfy the general display apparatus used at indoors, it may present degraded quality in the displayed image depending on the image contents. As an example of the degraded image quality, there is a color fringe, which is a phenomenon where unfit color appears in a given region of an edge of an object in the displayed image. In other words, depending on the structure of the display, the color fringe may selectively appear. Accordingly, a structure or method, which if the color fringe appears in the displayed image, resolves the color fringe to improve the image quality, may be required.

SUMMARY

In accordance with an example aspect of the disclosure, a display apparatus is provided, the apparatus including a display, a signal processor configured to process an image signal to display an image on the display, and a controller configured to determine at least one region of possible color distortion from an edge area in the image displayed on the display, and to change a color of the determined at least one region, based on a probability that a color distortion occurs in the determined at least one region and a replacement color. Accordingly, the display apparatus may resolve a color fringe phenomenon occurring in the edge area, thereby improving image quality.

The replacement color may be determined based a probability that the determined at least one region belongs to a foreground or a background of the image and representative colors for the foreground and the background, respectively. With this, the display apparatus may remove the color fringe in the color distortion region.

The representative color for the foreground may include a mean of color values of pixels in the foreground, and the representative color for the background may include a mean of color values of pixels in the background.

Further, the controller may be configured to determine the probability that the determined at least one region belongs to the foreground or the background using a brightness and a saturation of the determined at least one region.

Also, the controller may be configured to determine the probability that the color distortion occurs based on at least one of a distribution for color values of a plurality of pixels of the edge area and a characteristic of the display.

The distribution for color values of the plurality of pixels may represent dispersion for at least one of a hue and a saturation of the plurality of pixels.

The controller may be configured, so that the larger a difference in hue and saturation between one region and other regions in the edge area is, the higher a probability that the color distortion occurs in one region of the edge area is determined.

Also, the characteristic of the display may include at least one of a pixel size, a ratio of effective light emitting area per pixel, and an arrangement type of a plurality subpixels in a pixel of the display.

The probability that the color distortion occurs in the one region of the edge area may be determined in proportion to the pixel size and in inverse proportion to the ratio of effective light emitting area per pixel.

In accordance with another example aspect of the disclosure, a recording medium configured to store a program code for a method executable by at least one processor of a display apparatus is provided, the method including receiving an image signal, determining at least one region of possible color distortion from an edge area in the image displayed on a display of the display apparatus, and changing a color of the determined at least one region, based on a probability that a color distortion occurs in the determined at least one region and a replacement color.

The replacement color may be determined based on a probability that the determined at least one region belongs to a foreground or a background of the image and representative colors for the foreground and the background, respectively.

The representative color for the foreground may include a mean of color values of pixels in the foreground, and the representative color for the background may include a mean of color values of pixels in the background.

Further, the changing may include determining the probability that the determined at least one region belongs to the foreground or the background using a brightness and a saturation of the determined at least one region.

Also, the changing may include determining the probability that the color distortion occurs based on at least one of a distribution for color values of a plurality of pixels of the edge area and a characteristic of the display.

The distribution of color values of the plurality of pixels may represent dispersion for at least one of a hue and a saturation of the plurality of pixels.

The larger a difference in hue and saturation between one region and other regions in the edge area is, the higher a probability that the color distortion occurs in the one region of the edge area may be determined.

Also, the characteristic of the display may include at least one of a pixel size, a ratio of effective light emitting area per pixel, and an arrangement type of a plurality subpixels in a pixel of the display.

The probability that the color distortion occurs in the one region of the edge area may be determined in proportion to the pixel size and in inverse proportion to the ratio of effective light emitting area per pixel.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Below, example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. may be employed for describing variety of elements, and the terms are used for distinguishing between one element and another element. Therefore, the meanings of the elements are not limited by the terms, and the terms are also used just for explaining the corresponding embodiment without limiting the idea of the disclosure.

Figure 1:
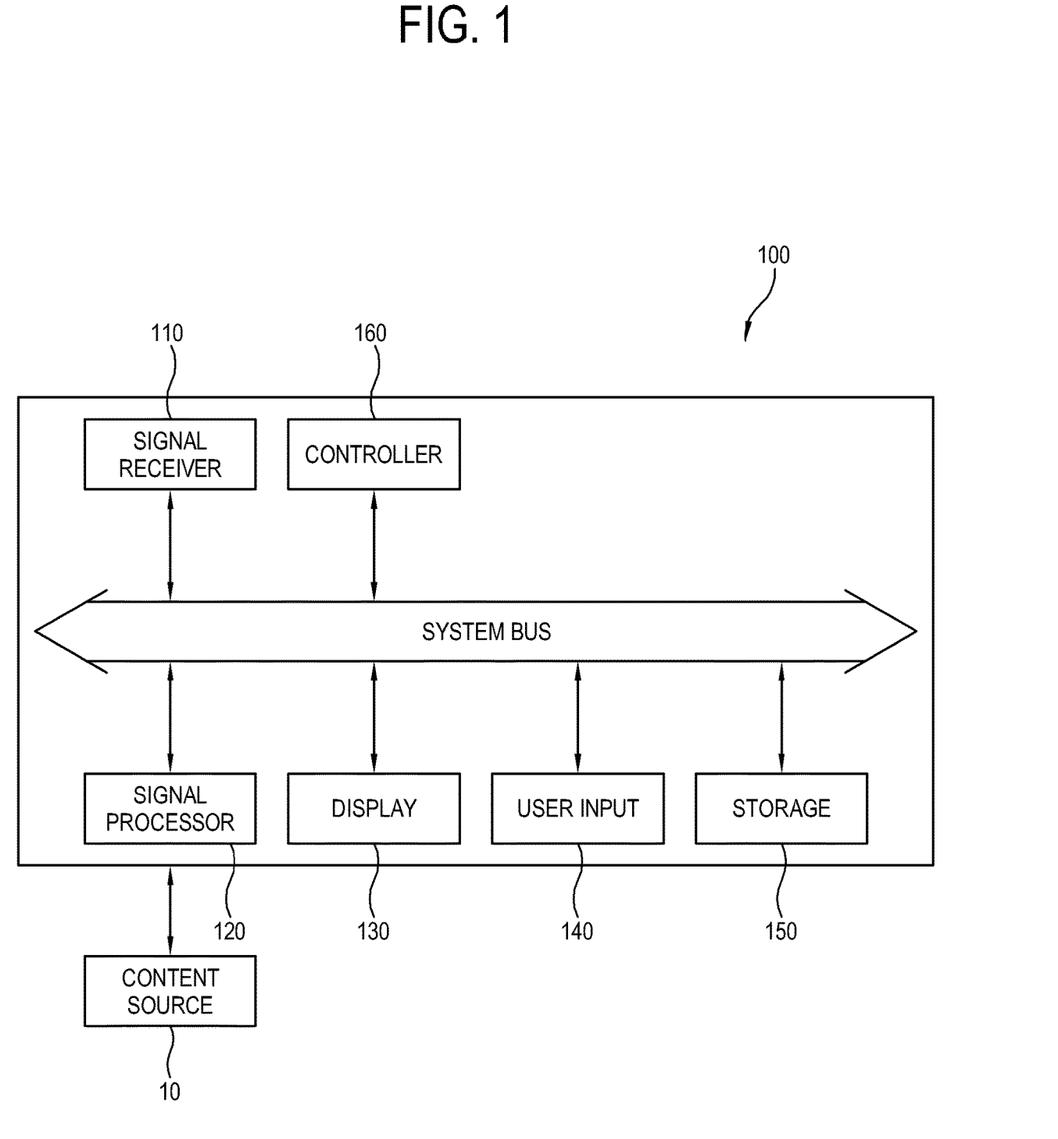
FIG. 1 is a block diagram illustrating an example display apparatus according to an example embodiment.

FIG. 1 is a block diagram illustrating an example display apparatus according to an example embodiment.

As illustrated in FIG. 1, the display apparatus 100 according to an example embodiment is achieved by an apparatus, e.g., a digital signage or a digital cinema, having a relatively large screen used in outdoor environment rather than a relatively small screen used in indoor environment. Although the idea of the disclosure is not limited as being applied only to the digital signage, the effect of the disclosure is more pronounced when the display apparatus is achieved by the digital signage. Explanations on this will be described later.

The display apparatus 100 includes a signal receiver 110 to receive a content signal from various content sources 10, a signal processor 120 to process the content signal received through the signal receiver 110, a display 130 to display a content image based on the content signal processed by the signal processor 120, a user input (e.g., including input circuitry) 140 with which a user performs input operations, a storage 150 to store data, and a controller (e.g., including processing circuitry) 160 to perform arithmetic operations for the processing of the signal processor 120 and to control all sorts of operation for the display apparatus 100. These elements are interconnected via a system bus. The constructions as described above are directly related in implementing the idea of the disclosure in the display apparatus 100. Accordingly, explanations on constructions other than the above constructions may be omitted.

The signal receiver 110 includes a communication module comprising communication circuitry for receiving the content signal from content source 10 or the like various external apparatuses. Although the signal receiver 110 is basically configured to receive signals or data from the outside, it is not limited thereto and may be implemented to enable bidirectional communication. The signal receiver 110 includes various signal receiving circuitry, such as, for example, and without limitation, at least one from among elements including a tuning chip provided to tune, for example, a radio frequency (RF) signal with a designated frequency, an Ethernet module to receive packet data by wire from an internet, a wireless communication module to receive packet data by wireless according to various standards, such as a wireless fidelity (Wi-Fi), a Bluetooth and the like, connection ports to connect external memories, such as a universal serial bus (USB) memory and the like, etc. In other words, the signal receiver 110 includes a data input interface in which communication modules or ports corresponding to various kinds of communication protocols are combined.

The signal processor 120 may include various signal processing circuitry and performs various processes with respect to the content signal received by the signal receiver 110 to reproduce a content corresponding thereto. The signal processor 120 may include various circuitry, such as, for example, and without limitation, a hardware processor implemented as a chipset, a circuit, a buffer and the like, which are embedded or mounted on a printed circuit board. Depending on design methods, the signal processor 120 may be also implemented as a system on chip (SoC). Basically, the signal processor 120 processes a video signal component extracted from the content signal to display a content image on the display 130.

Since the content signal includes signal components of various characteristics, such as an audio signal component and additional data, as well as the video signal component, the signal processor 120 may demultiplex the content signal to extract required signal components. For example, the signal processor 120 may extract the video signal component by separating respective packets in the multiplexed content signal according to packet identifiers (PIDs). Of course, if the content signal includes only the video signal component, the demultiplexing process may be omitted. If the display apparatus 100 further includes a speaker, the signal processor 120 processes the video and audio signal components according to individual processing processes, and then outputs the processed video and audio signal components to the display 130 and the speaker, respectively.

In processing the video signal component, the signal processor 120 performs an image processing process including decoding, image enhancement, scaling, and so on with respect to the video signal component, and outputs the processed video signal component to the display 130.

The display 130 displays the video signal component processed by the signal processor 120 as an image. To display the image, the display 130 may have various structures and designs applied thereto. As an example, as in the above example embodiment, if the display apparatus 100 is provided to have a large screen, a LED display structure may be applied.

The display 130 having the LED display structure is achieved by a combination of substrates on which LEDs for RGB colors are mounted. However, the disclosure is not limited to such a construction. According to circumstances, the display 130 may be achieved by a combination of substrates on which LEDs for colors including white, magenta, cyan, yellow and the like are mounted.

Basically, LEDs for RGB colors are included in every pixel, and a separate display panel is not applied. In the LED display structure, the LEDs for RGB colors in every pixel are individually switched on and off to display an image on the full screen.

In comparison, in a general liquid crystal display panel, there are subpixels for RGB colors divided by black matrix in every pixel and color filters corresponding to the subpixels, respectively. If light emitted from a light source, such as LEDs, is made uniform through a light guide plate, optical sheets and so on and transferred to the display panel, the light has RGB colors as it passes through the color filters corresponding to the subpixels, respectively. Here, it should be appreciated that the liquid crystal display panel structure may also have LEDs as the light source and the term 'LED display' is merely a name for representing the structure of the display 130, as described above.

As above, the LED display structure in which each unit pixel has the LEDs for RGB colors is easy to implement the large screen, as compared with the liquid crystal display panel structure. However, due to the structural difference therebetween, content images displayed on the displays according to the respective structures based on the same content signal may appear differently. Explanations on this will be described later.

The user input 140 may include various input circuitry and transmits various predetermined control commands or information to the controller 160 in accordance with user's manipulations or inputs. In other words, the user input 140 transmits to the controller 160, various events generated in accordance with user's intensions, so that the controller 160 operates according to corresponding events. The user input 140 may be variously achieved in accordance with types of the display apparatus 100. For example, if the display apparatus 100 is a digital signage, the user input 140 may include a remote controller separated from a main body of the display apparatus 100 taking into account that in general, it is difficult for the user to physically access the display apparatus 100.

The storage 150 stores a variety of pieces of data under control of the controller 160. The controller 160 accesses the storage 150 and performs reading, writing, editing, deleting, updating, etc. with regard to the data stored in the storage 160. The storage 150 includes a flash memory, a hard disc drive, a solid state drive (SSD) or the like non-volatile memory for retaining data regardless of whether the display apparatus 100 is turned on or off, and a buffer, a RAM or the like volatile memory for temporally loading data processed by the signal processor 120 or the controller 160.

The controller 160 may include various processing circuitry, such as, for example, and without limitation, a CPU, a microprocessor or the like to control operation of elements including the signal processor 120 in the display apparatus 10 and to perform calculation executed by the signal processor 120.

Under such a structure, the display apparatus 100 according to an example embodiment displays on the display 130, the content image based on the video signal component of the content signal. However, if the display 130 has the LED display structure with the relatively large screen as described above, it may cause a problem in image quality while displaying the content image. Hereinafter, the problem will be described.

Figure 2:
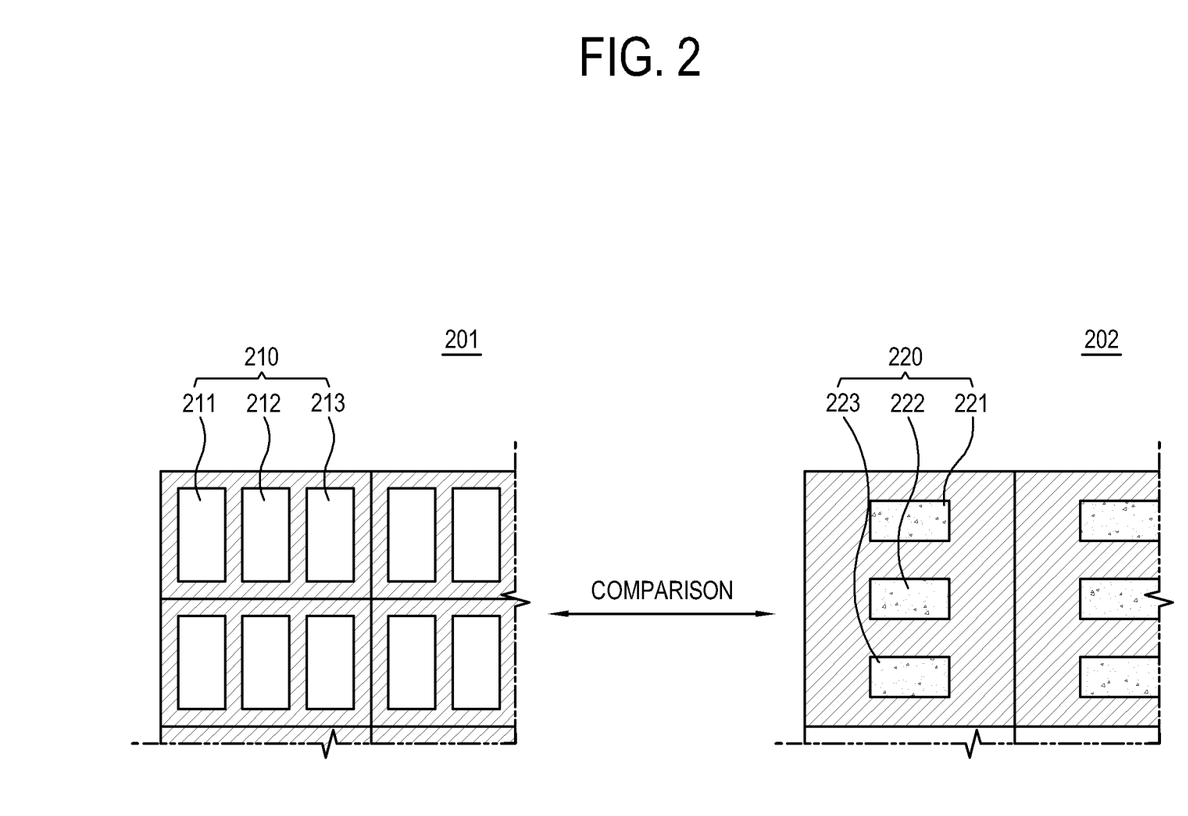
FIG. 2 is a diagram illustrating comparing a pixel structure of a light emitting diode (LED) display applied to a display apparatus with a pixel structure of a liquid crystal display panel according to an example embodiment.

FIG. 2 is a diagram illustrating comparing a pixel structure of a LED display applied to the display apparatus with a pixel structure of a liquid crystal display panel according to an example embodiment.

Referring to FIG. 2, a pixel structures for a display 201 having a liquid crystal display structure and a pixel structures for a display 202 having a LED display structure are compared.

In the display 201 having the liquid crystal display structure, every pixel 210 of the liquid crystal display panel includes a plurality of subpixels 211 212 and 213. The plurality of subpixels 211 212 and 213 is separated from one another by a black matrix 214 and corresponds to RGB colors, respectively. In broad outlines, the plurality of subpixels 211 212 and 213 is arranged along a transverse direction. The plurality of subpixels 211 212 and 213 has a plurality of color filters corresponding to the RGB colors, respectively. As light provided from a backlight passes through the plurality of subpixels 211 212 and 213, it is changed into RGB lights by the plurality of color filters and thereby the RGB lights are emitted.

A characteristic of the liquid crystal display structure is as follows. Since in a rough way, the display 201 is relatively small in size, every pixel 210 is also relatively small in size. An aperture representing an effective light emitting area per unit pixel, which is approximately 60%, is relatively large.

On the other hand, in the display 202 having the LED display structure, every pixel 220 includes a plurality of subpixels 221 222 and 223. Each of subpixels 221 222 and 223 includes LEDs for RGB colors mounted on the substrate. In broad outlines, the plurality of subpixels 221 222 and 223 is arranged along a longitudinal direction. However, depending on design methods, the plurality of subpixels 221 222 and 223 may be also arranged along a transverse direction.

A characteristic of the LED display structure is as follows. Since in a rough way, the display 202 is relatively large in size, every pixel 220 is also relatively large in size. An aperture per pixel 220, which is approximately 30%, is relatively small. Also, the LED display structure is governed by a wide color gamut about 170% wider than a sRGB color gamut, and since it does not include a construction of absorbing light output from the subpixels 221 222 and 223, it represents a high light level of thousands of nits.

Taking account of the structural difference as above, circumstances where the display 201 having the liquid crystal display structure and the display 202 having the LED display structure display an image of the same content are considered.

The liquid crystal display structure is a structure in which the light emitted from the backlight basically passes through the color filters and the liquid crystal, thereby allowing the respective subpixels 211 212 and 213 to make the color lights. The liquid crystal display structure may therefore have a pixel structure of very high density. Also, the aperture through which the light passes is high level. Accordingly, with the liquid crystal display structure, it is possible to enables a relatively detailed representation with respect to an edge of an object in the image.

On the other hand, the LED display structure enables an output of high color gamut and high light amount, as compared with the liquid crystal display structure, since every one of the subpixels 221, 222, and 223 in the pixel 220 is achieved by a small LED and independently emits light. However, with the LED display structure, it is impossible to enable the relatively detailed representation with respect to the edge of the object in the image, since pixel pitch is relatively long and the aperture is relatively low. Due to this, when the image of the same content is displayed, color distortion phenomenon which does not appear in the liquid crystal display structure may relatively appear much more in the LED display structure.

In other words, even if the image of the same content is displayed, the color distortion phenomenon may appear in the displayed image in the LED display structure because of the difference in display structure. In particular, since many contents are created taking account of not the LED display structure, but the liquid crystal display structure, a problem may occur in image quality when images of corresponding contents are displayed on the LED display structure.

Figure 3:
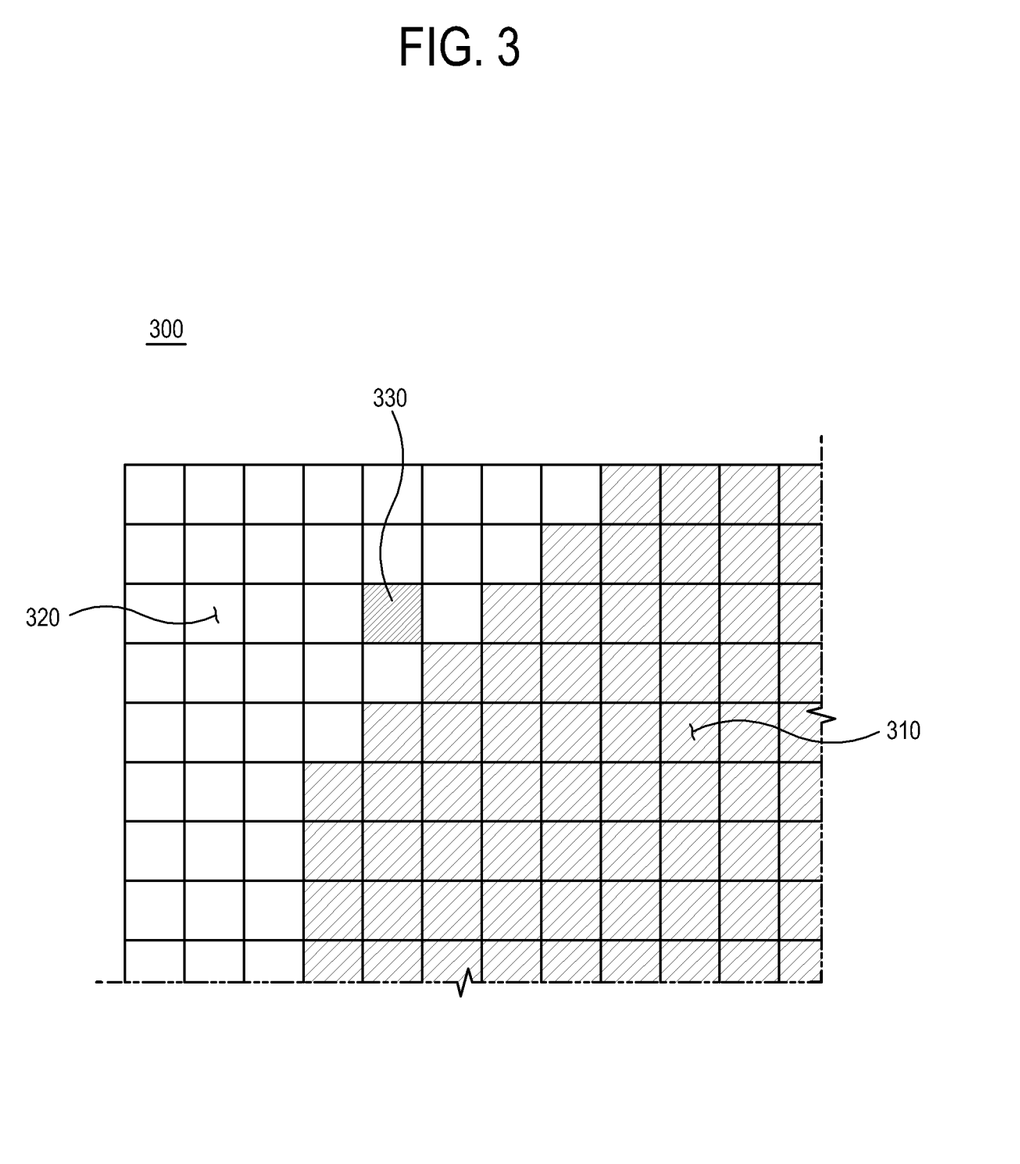
FIG. 3 is a diagram illustrating an example color distortion phenomenon, which appears in a region of an image displayed on a display apparatus according to a related art.

FIG. 3 is a diagram illustrating an example of the color distortion phenomenon, which appears in a region of an image displayed on a display apparatus according to a related art.

As illustrated in FIG. 3, the image 300 displayed on the display apparatus according to the related art includes a plurality of pixel regions. Based on an object in the image 300, the image 300 may be divided into a foreground 310 including the object and a background 320 not including the object.

In the diagram, since the image 300 is simply expressed in a monotone, an edge of the object is illustrated as if it clearly appears by pixel areas bordering the foreground 310 and the background 320. However, in a real image 300, the edge of the object is not clearly identified. Here, for convenience, a predetermined range of area including the edge is referred to an edge area.

If the display apparatus according to the related art includes a display of the LED display structure, a color distortion phenomenon may occur in the edge area of the image 300 displayed on the corresponding display due to the structural characteristic, as described above. A typical example of such a distortion phenomenon is a color fringe phenomenon.

If a conventional antialiasing processing is applied to the image, the color fringe phenomenon may remarkably appear. The antialiasing processing is for the border of the object to look natural by smoothing the edge thereof. Accordingly, the antialiasing-processed image looks natural in the liquid crystal display, but may appear as a color fringe in the LED display.

The color fringe phenomenon represents a phenomenon that in the image, some region is not matched with surrounding regions in color. For instance, if in the image 300, a given subject region is expressed in a monotone color, for example, of black and white in the gross, but a specific pixel 330 represents a red color, the specific pixel 330 is unmatched and stands out from the subject region. Or, when the subject region in the image 300 has a reddish color, which is not monotone, the specific pixel 330 may represent a blue color different from surrounding reddish color. For the pixel 330 in which the phenomenon as above appears, it may be regarded that the color fringe has generated.

The larger the screen size and the pixel size is and the smaller the aperture is, the more marked the color fringe appear. Also, in a structure of subpixels, if the subpixels are arranged in a longitudinal direction, the color fringe may relatively much more appear, as compared with those arranged in a transverse direction. Accordingly, the image displayed on the display of the LED display structure has a high probability that the color fringe occurs.

Hereinafter, a method of resolving the color fringe phenomenon by the display apparatus having the display of the LED display structure will be described.

In displaying an image signal as an image on the display, the display apparatus according to an example embodiment determines at least one region of possible color fringe from an edge area in the image displayed on the display, and changes a color of a region in which a probability that a color fringe occurs is relatively high, using a probability that the color fringe occurs in the determined at least one region and a replacement color therefor.

Accordingly, the display apparatus may remove and/or reduce the color fringe phenomenon occurring in the edge of the image, thereby improving image quality.

Figure 4:
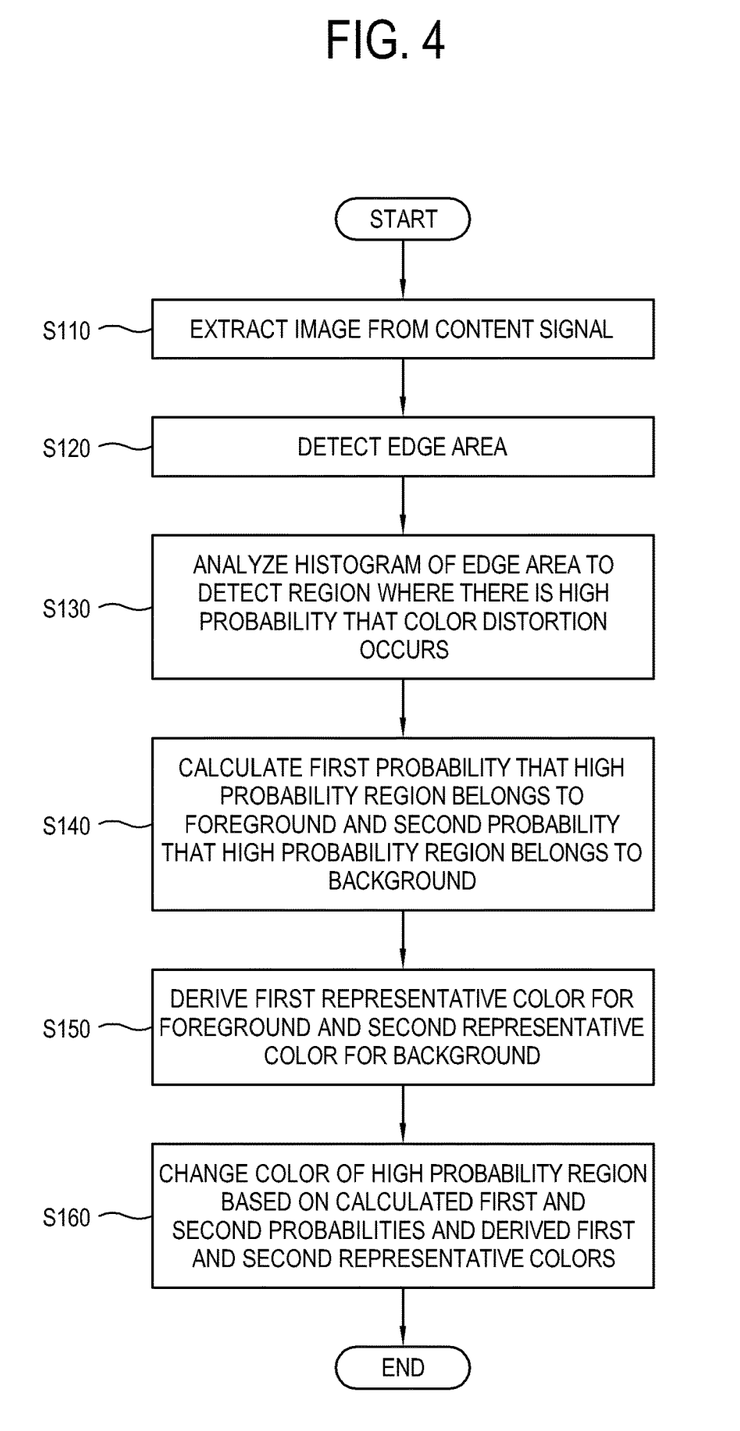
FIG. 4 is a flowchart illustrating an example control method of a display apparatus according to an example embodiment.

FIG. 4 is a flowchart illustrating an example control method of the display apparatus according to an example embodiment.

As illustrated in FIG. 4, at an operation S110, the display apparatus extracts an image, which becomes a processing subject, from a received content signal. The processing subject is expressed in image frames At an operation S120, the display apparatus detects an edge area in the image.

At an operation S130, the display apparatus analyses a histogram of the detected edge area to detect at least one region in which a probability that a color distortion, e.g., a color fringe occurs is relatively high.

At an operation S140, the display apparatus calculates (determines) a first probability that the detected at least one region belongs to a foreground of the image and a second probability that the detected at least one region belongs to a background of the image.

At an operation S150, the display apparatus derives first and second representative colors for the foreground and the background, respectively.

At an operation S160, the display apparatus changes a color of the at least one region in which the probability that the color fringe occurs is relatively high, using the first and second probabilities calculated at the operation S140 and the first and second representative colors derived at the operation S540.

The operations as above are executed by the signal processor under control of the controller of the display apparatus. With this, the display apparatus according to an example embodiment may resolve the color fringe phenomenon occurred in the image.

The display apparatus may change colors of corresponding at least one pixel, e.g., a plurality of pixels directly into the derived colors or into new colors in which additional offsets are applied to the derived colors. Either way, the display apparatus determines colors for update based on the color corresponding to any one selected from among the foreground and the background. A method of deriving the colors corresponding to the foreground and the background, i.e., the first and second representative color for the foreground and the background will be described later.

Hereinafter, a concrete method for executing the operations of the control method according to an example embodiment will be described.

Figure 5:
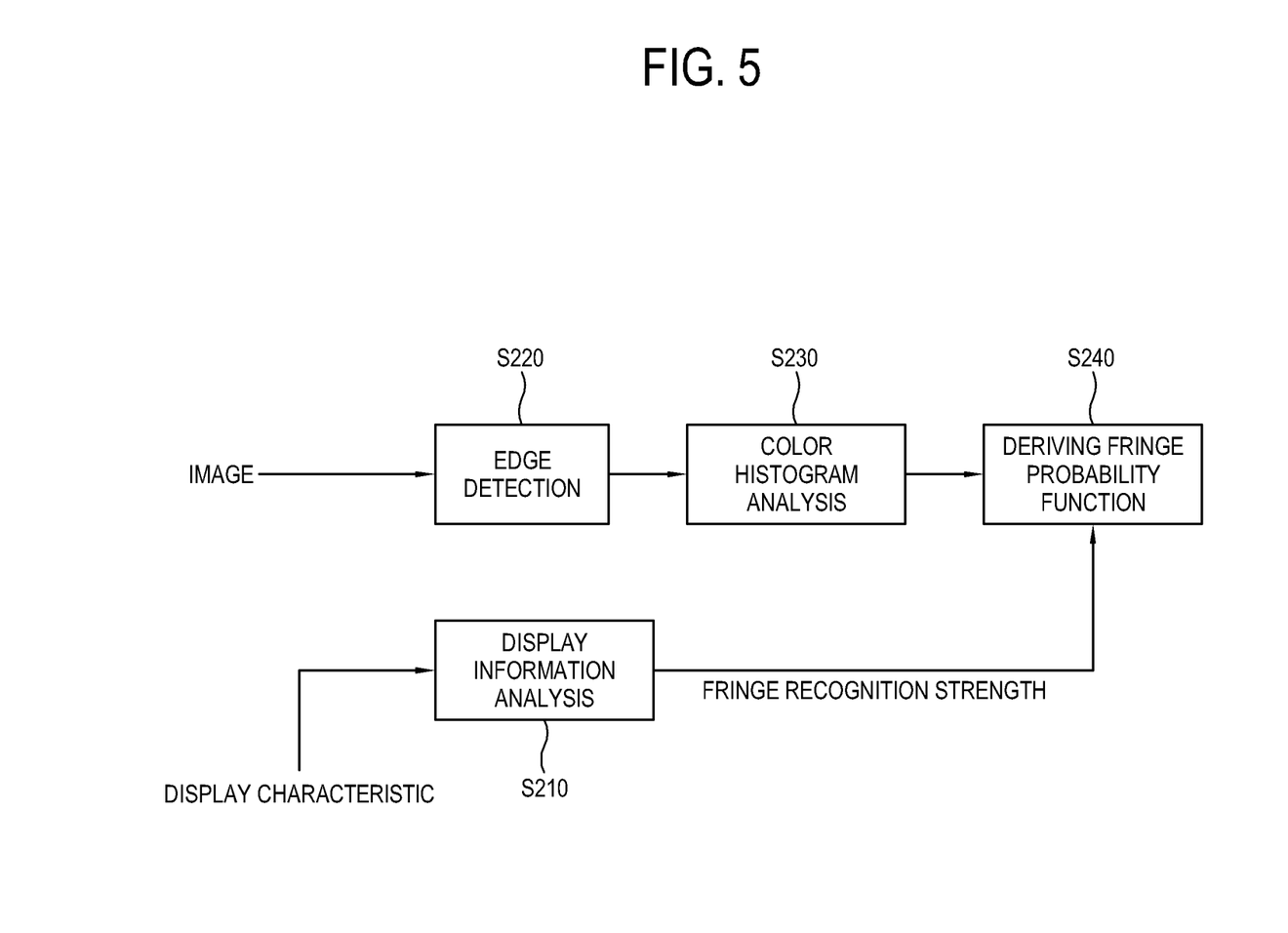
FIG. 5 is a block diagram illustrating an example process of detecting a color fringe at a display apparatus according to an example embodiment.

FIG. 5 is a block diagram illustrating an example process of detecting the color fringe at the display apparatus according to an example embodiment.

As illustrated in FIG. 5, the display apparatus may determine at least one pixel in which the color fringe occurs in an image, using a probability function. At an operation S210, the display apparatus analyses information of the display to generate a fringe recognition strength. The fringe recognition strength comes to a standard for determining whether how remarkably the color fringe appears in the image when the image is displayed on the display, and is a parameter determined according to a structural characteristic of the display. At an operation S220, the display apparatus detects an edge of the image to derive an edge area, and at an operation S230, analyzes a color histogram on the edge area. The edge area may be determined as a region of a predetermined area including the detected edge. At an operation S240, the display apparatus finally derives a fringe probability function based on the analysis result of the color histogram and the fringe recognition strength. The display apparatus identifies at least one pixel in which the color fringe occurs in the edge area based on the fringe probability function.

The display apparatus first derives the fringe recognition strength based on the characteristic of the display. The characteristic of the display represents a unique property related to a structure of the display provided in the display apparatus and includes, for example, a pixel-per-inch (PPI) to show a resolution of the display, an aperture ratio to show a ratio of effective light emitting area per pixel, a structure of subpixels in a pixel, etc. These examples of characteristics are properties directly related in generating the color fringe.

The fringe recognition strength derives based on the characteristic of the display related with the color fringe phenomenon. For example, the fringe recognition strength S may be derived from the following mathematical formula.

$$S=f(a_1 x_1 + a_2 x_2 + a_3)$$ [Mathematical formula 1]

Here, $x_1$ corresponds to a PPI value, and $x_2$ corresponds to the aperture ratio. Weighted values $a_1$, $a_2$, and $a_3$ are values, which are predetermined by experiments or learnings. These values may be also determined taking account of the structure of subpixels. A function f may be applied in various forms according to design methods. The applied forms of the function f will be described later.

The display apparatus detects an edge of an object in the image. As a method of detecting the edge, various mask methods may be applied. Basically, the edge is a border where a brightness is changed from a low value to a high value or vice versa in the image. By using first and second differentiations, the display apparatus may find out the edge, which is the border where the brightness of the image is sharply changed.

Since the edge is a place where a change in contrast is large in the image, the display apparatus may find out a rate of change, e.g., a gradient in such a contrast. The gradient may be detected by the first differentiation. In the first differentiation, there may be a Sobel mask, a Prewitt mask, Roberts mask, etc.

The first differentiation method may be too sensitive for the edge. Thus, the second differentiation method is provided to respond with less sensitivity for the edge by differentiating one more time than in the first differentiation method. In the second differentiation, there may be a Laplacian mask and the like.

If the object in the image is characters or letters, the display apparatus may detect edges of the characters based on a predetermined character detection algorithm. As an example of the character detection algorithm, there is a stroke width transform (SWT).

Figure 6:
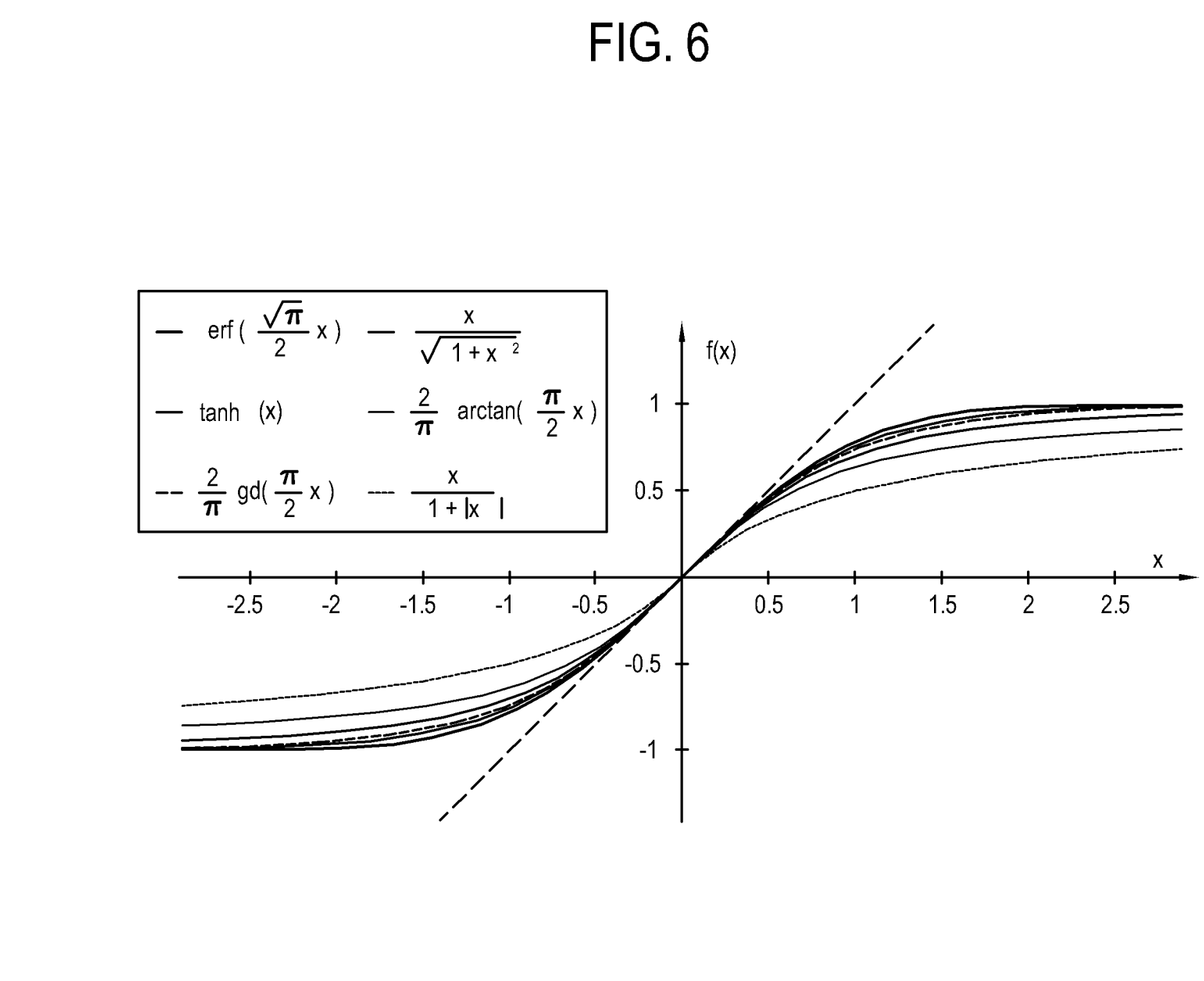
FIG. 6 is a graph illustrating examples of functions referring to when a display apparatus according to an example embodiment deals with a color fringe.

FIG. 6 is a graph illustrating examples of functions referred to when the display apparatus according to an example embodiment deals with the color fringe.

As illustrated in FIG. 6, the display apparatus may use various functions in detecting at least one pixel in which the color fringe occurs and performing processing for removing the color fringe in the detected at least one pixel. The functions are used over all in a process for processing the color fringe, which includes separating the foreground and the background and calculating a fringe probability function, and so on to be described later, as well as calculating the fringe recognition strength as described above. At respective operations of the process, the same function or different functions may be used.

As an example of such functions f, a function of y=ax type may be available. Here, x and y are variables and a is a predetermined constant. However, in view of experiment, to represent a change where outputs are gradual or continuous, not discontinuous or radical, a function of sigmoid type is applied. The sigmoid function as a specific type of logistic function commonly calls all sorts of functions, which represent a curve of sigmoidal form.

As examples of a sigmoid function f(x) about the variable x, there are [erf{(x/2)√n}], [x/√(1+x²)], [tan h(x)], [(2/π) arctan(πx/2)], [(2/π)gd(πx/2)], [x/(1+|x|)], etc. These sigmoid functions represent curves of similar sigmoidal form, respectively.

The display apparatus may selectively use such functions to deal with the color fringe. However, depending on design methods, the display apparatus may use various other types of functions besides the sigmoid function.

On the other hand, if an edge is detected in the image, the display apparatus detects pixel regions of M*N including the edge as the edge area. Here, M and N as predetermined constants may be values equal to or different from each other. The edge area may be determined in various methods. For example, the display apparatus detects the edge area by applying pixel regions of M*N around pixels detected as an edge with respect to the whole of edges.

The display apparatus analyses hue and saturation distributions for respective pixels of the detected edge area. The display apparatus may convert RGB values of the respective pixels into a HSV color system to analyze the hue and saturation distributions. Since a method for converting the RGB values of the respective pixels into the HSV color system is known in the art, detailed explanations on that will be omitted.

The HSV color system has a principle, which designates specific colors by using three coordinates of hue, saturation and value. A HSV color space model may be expressed by a solid figure in the form of a cylinder or a turbinate solid figure.

H values refer, for example, to relative arrangement angles when in a color circle in which a visible light spectrum is arranged in the form of a ring, R having the longest wavelength is expressed by 0 degree. In other words, the H values have a range of 0 to 360 degrees. S values represents saturated degrees of specific color when the most saturated state of specific color is expressed by 100%. If a S value is 0%, it represents an achromatic color of the same value V. V values represents brightness degrees in a state where a white color is expressed by 100% and a black color is expressed by 0%.

The display apparatus may represent the RGB values of the respective pixels in the HSV color system to derive the color histogram, and determine at least one pixels in which the color fringe occurs in the edge area based on the hue and saturation distributions appeared in the derived color histogram.

Figure 7:
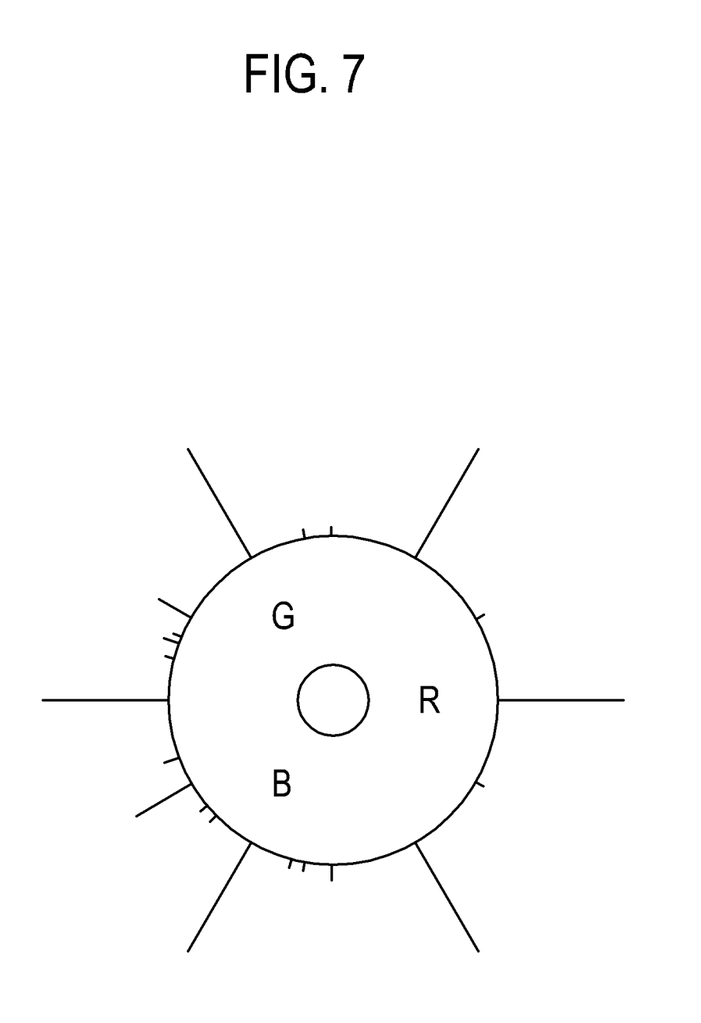
FIG. 7 is a color histogram illustrating an example where a color fringe phenomenon does not appear in an edge area of an image.

FIG. 7 is a color histogram illustrating an example where the color fringe phenomenon does not appear in the edge area of the image.

As illustrated in FIG. 7, the display apparatus may create color histograms for respective pixels included in the edge area of the image. The display apparatus converts RGB values of the respective pixels into the HSV color system and creates a histogram for respective hues to analyze a hue distribution. A circle of the histogram represents a spectrum of the hue. Thus, angles in the circle represent specific hues, respectively.

In the edge area in which the color fringe phenomenon does not occur, relatively fewer hues remarkably appear and other most hues do not appear. In other words, if the hue distribution appears relatively narrow in the edge area, it may be regarded that the color fringe phenomenon does not occur. Since a hue change is remarkable in the edge area, relatively fewer hues prominently appear.

Figure 8:
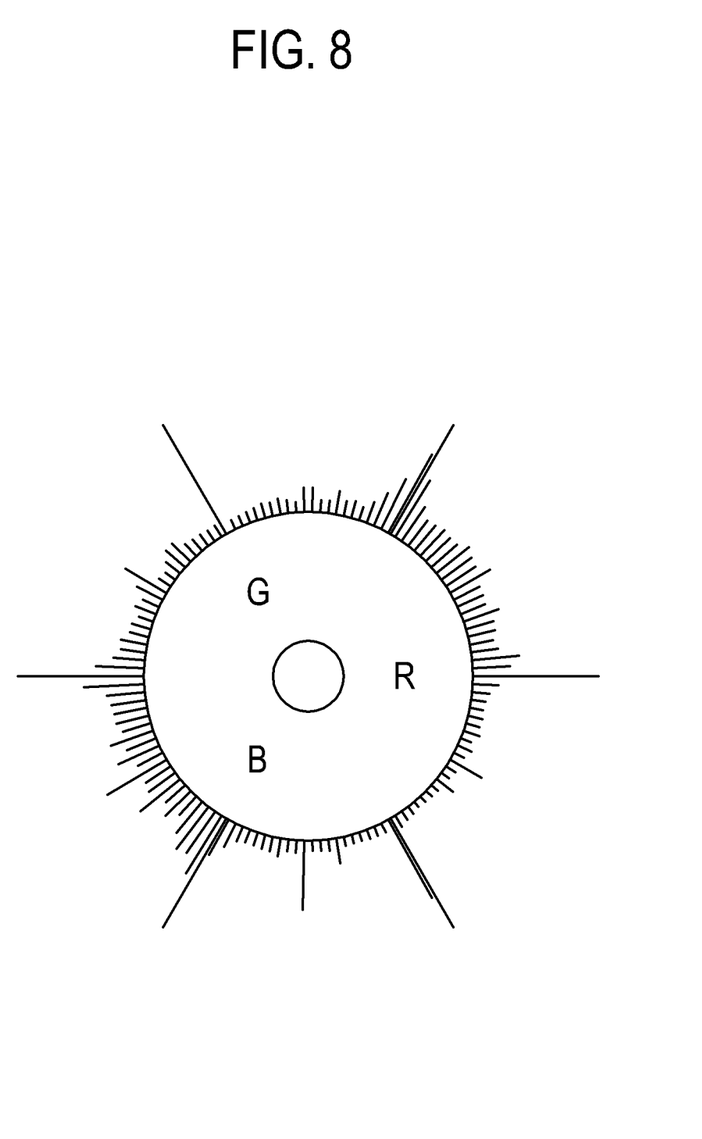
FIG. 8 is a color histogram illustrating an example where the color fringe phenomenon appears in the edge area of the image.

FIG. 8 is a color histogram illustrating an example where the color fringe phenomenon appears in the edge area of the image.

As illustrated in FIG. 8, relatively large numbers of hues are distributed in the histogram. A reddish hue, a yellowish hue and a blueish hue show values equal to or more than a predetermined value. Of course, specific several hues corresponding to the single color shows remarkably high values, but hues corresponding to intermediate colors thereof also show values equal to or more than the predetermined value.

As described above, if the hue distribution appears relatively wide, it may be regarded that the color fringe phenomenon occurs.

Although in the example embodiment, the color fringe determination is explained only with respect to the hue, it may be applied in a similar principle even with respect to the saturation. In short, if there are high dispersions in hue and saturation in the edge area, it may be estimated that there is a high probability that the color fringe occurs.

A fringe probability function $P_{fringe}$ capable of being derived through the color histogram analysis may be expressed by the following mathematical formula.

$$P_{fringe} = f(a_4 \sigma_{hue} + a_5 \sigma_{sat} + a_6 \max(sat) + a_7 \mu_{sat} + a_8 S + a_9)$$ [Mathematical formula 2]

Here, $\sigma_{hue}$, $\sigma_{sat}$, max(sat), $\mu_{sat}$, and S represent a dispersion of hue, a dispersion of saturation, a saturation value with the most distribution, a mean for saturation values, and a fringe recognition strength, respectively. $a_4$, $a_5$, $a_6$, $a_7$, $a_8$, and $a_9$ as weighting vectors are values predetermined by experiments.

In other words, determining which pixels represent the color fringe in the edge area is based on two primary parameters. One parameter is a structural characteristic of the display and the other parameter is dispersions for hue and saturation in the edge area.

The larger the pixel size or the pixel pitch is and the smaller the aperture is, the more marked the color fringe appear. If the structure of subpixels is a longitudinal type rather than a transverse type, the color fringe remarkably appears. Also, the larger the difference in hue and saturation between one pixel and other regions in the edge area is, the more marked the color fringe appears. The above mathematical formula is expressing such a principle as the probability function.

With respect to at least one pixel being detected that the color fringe occurs in the edge area according to the fringe probability function, the display apparatus changes a color of the detected at least one pixel through a color compensation method. For this, the display apparatus calculates a first probability that the detected at least one pixel is a foreground of the image and a second probability that the detected at least one pixel is a background of the image.

The first probability $P_F$ that the detected at least one pixel is the foreground and the second probability $P_B$ that the detected at least one pixel is the background may be expressed by the following mathematical formula.

$$P_F = f(a_{10}Y + a_{11}C + a_{12})$$

$$P_B = 1 - P_F$$ [Mathematical formula 3]

Here, Y is a brightness and C is a saturation. $a_{10}$, $a_{11}$, and $a_{12}$ as weighting vectors are values predetermined by experiments. According to the above mathematical formula, a side with a higher probability from among the foreground and the background is selected.

The display apparatus applies to the detected at least one pixel a first representative color for the foreground if the first probability that the detected at least one pixel is the foreground is higher than the second probability that the detected at least one pixel is the background and a second representative color of the background if the second probability is higher than the first probability. The first representative color $\mu_F$ for the foreground and the second representative color $\mu_B$ for the background may be expressed by the following mathematical formula.

$$\mu_F = \Sigma_{x \in F} |x|/NF$$

$$\mu_B = \Sigma_{x \in B} |x|/N_B \quad \text{[Mathematical formula 4]}$$

Here, x is RGB color values of the pixels, NF is the number of pixels for the foreground, and $N_B$ is the number of pixels for the background. In other words, the first representative color for the foreground represents a mean color of pixels in the foreground and the second representative color for the background represents a mean color of pixels in the background.

The display apparatus updates colors for the pixels in which the color fringe appears based on the mathematical formulas 3 and 4. A Color value $C_{update}$ updated for the pixel may be expressed by the following mathematical formula.

$$C_{update} = P_{fringe}(P_F \mu_F + P_B \mu_B) + (1 - P_{fringe}) C_{curr} \quad \text{[Mathematical formula 5]}$$

Here, $P_{fringe}$ is the fringe probability function, $P_F$ is the first probability that the detected pixel is the foreground, $P_B$ is the second probability that the detected pixel is the background, $\mu_F$ is the first representative color for the foreground, $\mu_B$ is the second representative color for the background, and $C_{curr}$ is a current color value of the detected pixel According to the method as above, the display apparatus may change the color with respect to the at least one pixel in which the color fringe occurs in the edge area, thereby removing the color fringe phenomenon.

Although the color fringe processing according to an example embodiment as described above is illustrated and explained as being applied to the display apparatus having the display of the LED display structure, it may be applied to display apparatuses having displays of other various structures to improve image quality. For example, in a display having a large screen, unit pixels are large in size, regardless of the display structure. Accordingly, the color fringe phenomenon recognized by the user in an image displayed on the large screen stands out much more, as compared with that in a small screen.

Also, color fringe processing basically adjusts a disharmonious color in the edge area. Accordingly, if the color fringe processing according to an example embodiment is performed after processing related to the edge of the image, more enhanced image quality may be provided.

For instance, in the processing related to the edge of the image, there is anti-aliasing. The anti-aliasing is a method, which smooths an edge of an object in the image by giving additional gradations thereto, thereby improving the overall image in quality. The anti-aliasing is a process, which is basically applied by many display apparatuses and applications.

However, since the anti-aliasing is targeted at the edge, a certain amount of distortion is finally reflected in the edge. For an image displayed on a relative small screen, there is advantage in that the anti-aliasing improves image quality rather than distortion. However, for an image displayed on a relative large screen, the distortion caused by the anti-aliasing comes into prominence and thereby a color fringe will result.

Accordingly, the display apparatus performs the anti-aliasing processing and then the color fringe processing with respect to the image, thereby removing the color fringe being causable by the anti-aliasing processing.

If the anti-aliasing processing and the color fringe processing are performed in combination, the display apparatus may operate as follows. In processing the image, the display apparatus determines whether the anti-aliasing processing is performed with respect to the image. If it is determined that the anti-aliasing processing is performed, the display apparatus performs the color fringe processing with respect to the image. To the contrary, if it is determined that the anti-aliasing processing is not performed, the display apparatus does not perform the color fringe processing with respect to the image. Alternatively, if the color fringe remarkably appears due to the anti-aliasing processing, the display apparatus may perform the color fringe processing as above.

Although in the above example embodiment, the method for implementing the idea of the disclosure has been explained as implemented using the probability function, the method of the disclosure is not limited thereto. Depending on design methods, the display apparatus may use a method to determine whether a certain pixel of the image corresponds to a foreground or a background thereof.

In other words, if a color distortion region is determined from an edge area in the image, the display apparatus determines whether the color distortion region corresponds to the foreground or the background. According to the determination, the display apparatus changes a color of the color distortion region. If the color distortion region corresponds to the foreground, the display apparatus changes the color of the color distortion region based on a first representative color for the foreground. If the color distortion region corresponds to the background, the display apparatus changes the color of the color distortion region based on a second representative color for the background.

With this, the display apparatus may resolve the color fringe phenomenon generated from the edge of the image and improve the image quality.

Figure 9:
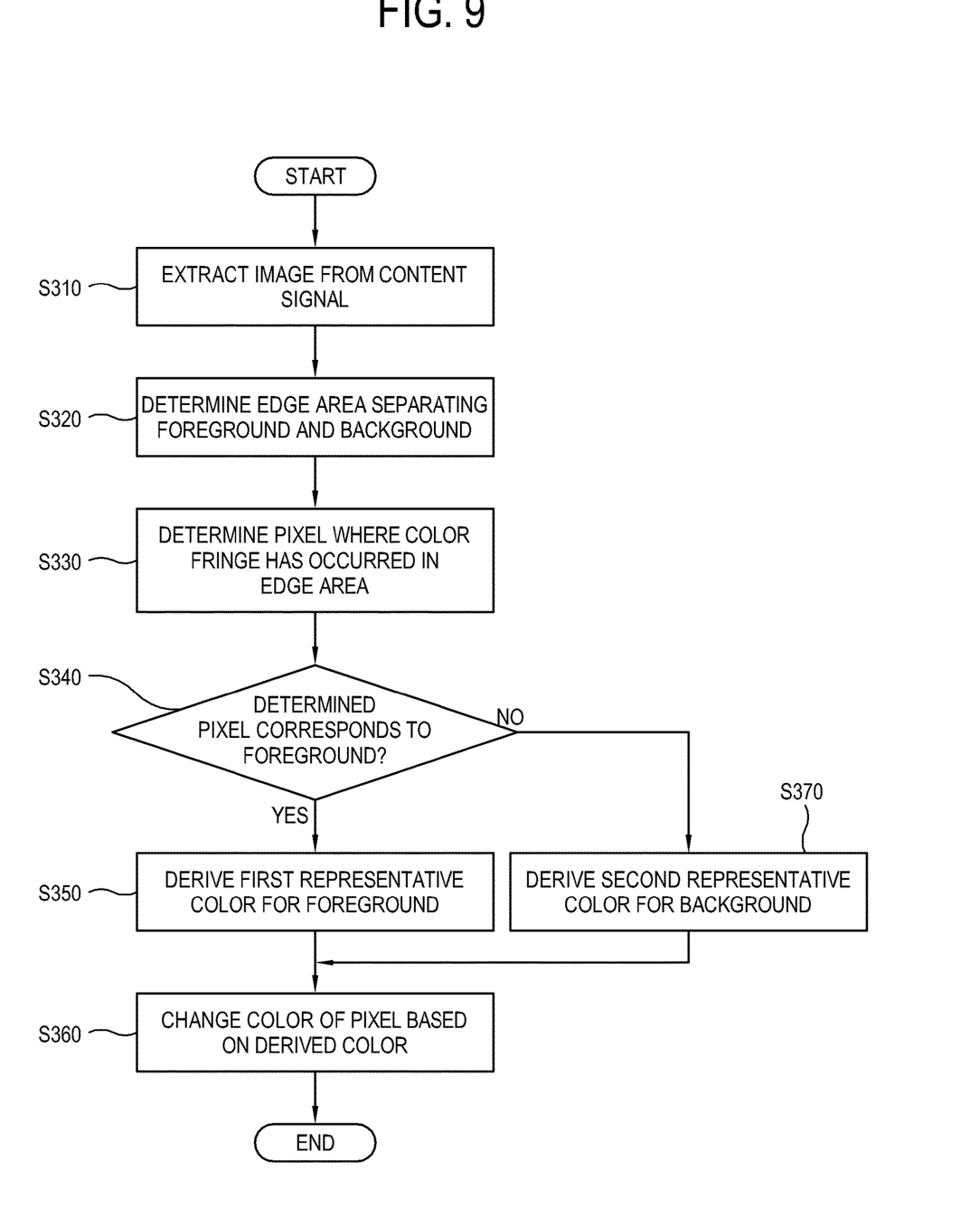
FIG. 9 is a flowchart illustrating an example control method of a display apparatus according to another example embodiment.

FIG. 9 is a flowchart illustrating an example control method of the display apparatus according to another example embodiment.

As illustrated in FIG. 9, at an operation S310, the display apparatus extracts an image, which becomes a processing subject, from a received content signal. The processing subject is expressed in image frames At an operation S320, the display apparatus determines an edge area in the image.

At an operation S330, the display apparatus determines a color fringe, e.g., a color distortion region in the edge area. In other words, the display apparatus does not determine the color fringe from the full area of the image, but determines the color fringe limiting a determination range to the edge area of the image. This is because as described above, the color fringe may remarkably appear in the edge area and it is not easy to determine whether specific pixels represent the color fringe for the full area of the image.

At an operation S340, the display apparatus determines whether at least one pixel corresponding to the color distortion region determined that the color fringe occurs corresponds to a foreground or a background of the image.

If the at least pixel corresponds to the foreground, at an operation S350, the display apparatus derives a first representative color for the foreground. At an operation S360, the display apparatus changes a color of the at least one pixel based on the derived color.

On the other hand, if the at least pixel corresponds to the background, at an operation S370, the display apparatus derives a second representative color for the background and moves to the operation S360.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

While various example embodiments have been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
   a display comprising a plurality of LED modules;
   a signal processor configured to process an image signal to display an image on the display; and
   a controller configured to:
   identify an object in the image displayed on the display;
   identify a replacement color regarding color distortion in a border of the identified object based on a characteristic of the plurality of LED modules, wherein the characteristic comprises an aperture of the plurality of LED modules; and
   change a color of the border of the identified object to the identified replacement color.

2. The apparatus according to claim 1, wherein the replacement color is identified based on a probability that the object belongs to a foreground or to a background of the image and representative colors for the foreground and the background, respectively.

3. The apparatus according to claim 2, wherein the representative color for the foreground comprises a mean of color values of pixels in the foreground, and the representative color for the background comprises a mean of color values of pixels in the background.

4. The apparatus according to claim 2, wherein the controller is configured to identify the probability that the object belongs to the foreground or to the background using a brightness and a saturation of the possible distortion region.

5. The apparatus according to claim 2, wherein the controller is further configured to identify a probability that the color distortion occurs based on a distribution of color values of a plurality of pixels of the border.

6. The apparatus according to claim 5, wherein the distribution for color values of the plurality of pixels represents dispersion for at least one of: a hue and a saturation of the plurality of pixels.

7. The apparatus according to claim 6, wherein the controller is configured to identify that the larger a difference in hue and saturation between one region and other regions in the border is, the higher a probability that the color distortion occurs in the one region of the border.

8. The apparatus according to claim 1, wherein the characteristic further comprises at least one of: a pixel size, a ratio of effective light emitting area per pixel, and an arrangement type of a plurality of subpixels in a pixel of the display.

9. The apparatus according to claim 8, wherein a probability that the color distortion occurs in the at least one region of the border is identified in proportion to the pixel size and in inverse proportion to the ratio of effective light emitting area per pixel.

10. A non-transitory computer readable recording medium having recorded thereon program code which when executed by a processor of a display apparatus causes the display apparatus to perform operations comprising:
    receiving an image signal;
    identifying an object in the image displayed on a display of the display apparatus, the display comprising a plurality of LED modules;
    identifying a replacement color regarding color distortion in a border of the identified object based on a characteristic of the plurality of LED modules of the display, wherein the characteristic comprises an aperture of the plurality of LED modules; and
    changing a color of the border of the identified object to the identified replacement color.

11. The non-transitory computer readable recording medium according to claim 10, wherein the replacement color is identified based on a probability that the identified object belongs to a foreground or to a background of the image and representative colors for the foreground and the background, respectively.

12. The non-transitory computer readable recording medium according to claim 11, wherein the representative color for the foreground comprises a mean of color values of pixels in the foreground, and the representative color for the background comprises a mean of color values of pixels in the background.

13. The non-transitory computer readable recording medium according to claim 11, wherein the changing comprises identifying the probability that identified object belongs to the foreground or to the background using a brightness and a saturation of the identified object.

14. The non-transitory computer readable recording medium according to claim 11, wherein the changing comprises identifying the probability that the color distortion occurs based on a distribution of color values of a plurality of pixels of the border.

15. The non-transitory computer readable recording medium according to claim 14, wherein the distribution for color values of the plurality of pixels represents a dispersion for at least one of: a hue and a saturation of the plurality of pixels.

16. The non-transitory computer readable recording medium according to claim 15, wherein the larger a difference in hue and saturation between one region and other regions in the border is, the higher a probability that the color distortion occurs in the at least one region of the border is identified.

17. The non-transitory computer readable recording medium according to claim 10, wherein the characteristic further comprises at least one of: a pixel size, a ratio of effective light emitting area per pixel, and an arrangement type of a plurality subpixels in a pixel of the display.

18. The non-transitory computer readable recording medium according to claim 17, wherein a probability that the color distortion occurs in the at least one region of the border is identified in proportion to the pixel size and in inverse proportion to the ratio of effective light emitting area per pixel.

* * * * *